US008610959B2

(12) United States Patent
Wang et al.

(10) Patent No.: US 8,610,959 B2
(45) Date of Patent: Dec. 17, 2013

(54) UPDATING A FLEET CMYK TO ENGINE CMYK LUT IN A COLOR MANAGEMENT STRATEGY

(75) Inventors: Yao Rong Wang, Webster, NY (US); Lalit Keshav Mestha, Fairport, NY (US); Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 514 days.

(21) Appl. No.: 13/029,753

(22) Filed: Feb. 17, 2011

(65) Prior Publication Data
US 2012/0212752 A1    Aug. 23, 2012

(51) Int. Cl.
*H04N 1/40*    (2006.01)
(52) U.S. Cl.
USPC ........... 358/3.23; 358/1.9; 358/504; 358/518; 382/167
(58) Field of Classification Search
USPC ................ 358/3.23, 1.9, 504, 518; 382/167
See application file for complete search history.

(56) References Cited

U.S. PATENT DOCUMENTS

| 2008/0252931 A1 | 10/2008 | Mestha et al. | |
| 2008/0253649 A1* | 10/2008 | Wang et al. | 382/167 |
| 2009/0296108 A1* | 12/2009 | Gil et al. | 358/1.9 |
| 2009/0296109 A1* | 12/2009 | Maltz et al. | 358/1.9 |

OTHER PUBLICATIONS

Mestha, et al., "Compensating for Print Engine Change in a Document Reproduction Device", U.S. Appl. No. 12/915,217, filed Oct. 29, 2010.

* cited by examiner

*Primary Examiner* — Benny Q Tieu
*Assistant Examiner* — Quyen V Ngo
(74) *Attorney, Agent, or Firm* — Philip E. Blair; Fleit Gibbons Gutman Bongini & Bianco P.L.

(57) ABSTRACT

What is disclosed is a system and method which addresses the problem of inheriting color management intent from a fleet color management LUT into a 4-to-4 cascaded LUT. The LUT is updated starting with a set of patches that either form a uniform or non-uniform grid of the LUT or can be projected to a uniform or non-uniform grid in the CMYK space using, e.g., PCA. A set of L*a*b* target as well a variable that serve the purpose of preserving the GCR and other elements of the fleet profile is obtained by passing the set of CMYK values to the fleet printer model. By iterating on the printer (or the printer model of the engine at the moment of the engine change) and converging to the targets, the engine device cmyk set is obtained. The LUT is formed between the uniform or non-uniform gridded CMYK and the device cmyk.

25 Claims, 8 Drawing Sheets

UPDATING A FLEET CMYK TO ENGINE CMYK LUT IN A COLOR MANAGEMENT STRATEGY

TECHNICAL FIELD

The present invention is directed to systems and methods for creating or updating a fleet CMYK to engine cmyk lookup table (LUT) in a cascaded color management strategy.

BACKGROUND

To meet customer demand, image output devices such as a printer or display need to produce a consistent spectrum of colors over time. Customers want a printing system to produce a particular colored document consistently from day to day, or from job to job. To control the color rendering consistency of a printing device, the printing device is typically characterized and calibrated prior to being shipped to a customer. The characterization and calibration process produces a set of LUTs (look-up tables) which correlate a standardized set of target colors with the appropriate device dependent color space values necessary to produce the target colors with the printing device. Characterization and calibration is generally referred to as profiling a device or printer. To accomplish profiling of a printing device, a spectrophotometer or other image sensing device is used to measure the colorimetric properties of the produced images. These measured colorimetric properties provide an objective basis of comparison to the reference target color set and provide the necessary feedback to iteratively generate accurate device dependent LUTs. Stated another way, device dependent CMYK values for one device can be correlated to the reference target color set, and this reference target color set can be correlated to the device dependent CMYK values for another device so that a LUT can be constructed relating the device dependent CMYK values for the first device to the device dependent CMYK values for the second device. Device profiling can also be applied to a display where an image sensing device is approximately located to the display for colorimetric measurements of the displayed image. In addition, multiple LUTs may be generated for an image output device to account for multiple media types and/or half tone screens.

In a cascaded color management strategy, a fleet profile that represents a typical printer and having many profiling strategies incorporated with appropriate GCR converts the images to a set of typical CMYK. The engine takes this set of typical CMYK and converts to its own device cmyk for printing. Advantages of a cascade strategy are that it can have one DFE with the fleet profile to drive a set of engines so that cost will be lower and it has a clean separation between the DFE and the engine so that development of the DFE and the engine color management system can be separated. In the cascade strategy, many elements of color management are handled inside the fleet profile that resides in the DFE, while the variation of the individual engine is handled by a multi-dimensional LUT that transforms from the fleet CMYK to the engine cmyk for printing and that resides inside the engine. A unique requirement from this strategy is to construct the LUT that preserves the color management strategy of the fleet profile in the DFE. When the engine changes due to drifting or component replacing, the LUT has to be updated.

Accordingly, what is needed in this art are increasingly sophisticated systems and methods for generating (creating/updating) a fleet CMYK to engine cmyk lookup table (LUT).

INCORPORATED REFERENCES

The following U.S. Patents, U.S. Patent Applications, and Publications are incorporated herein in their entirety by reference.

"Image Output Color Management System And Method", U.S. Publication No. 20080252931, by Mestha et al.

"Compensating For Print Engine Change In A Document Reproduction Device", U.S. application Ser. No. 12/915,217, by Mestha et al.

BRIEF SUMMARY

What is disclosed is a novel system and method which addresses the problem of inheriting color management intent from a fleet color management LUT into a 4-to-4 cascaded LUT to compensate for a change having occurred in an individual engine due to the engine having drifted or otherwise having changed. This method uses the CMYK and/or RGB fleet device link transform to generate starting LUT nodes for the inverse of the drifted printer model. The nodes are generated by inputting CMYK or RGB into the CMYK device link at a color space resolution sufficient to determine output nodes. The output of the device link is CMYK from which a corresponding LAB can be determined using the fleet printer model. A starting LUT is then created at the Lab destination nodes. An iterative control method begins with this starting LUT to produce an inverse specific printer model that contains a close approximation for the color management intent. The LUT is updated starting with a set of patches that either form a uniform grid of the LUT or can be projected to a uniform grid in the CMYK space. Projection can be performed using, for instance, a principal component analysis (PCA) technique. A set of L*a*b* targets, as well a variable that serve the purpose of preserving the GCR and other elements of the fleet profile, are obtained by passing the CMYK values through the fleet printer model. By iterating on the printer (or the printer model of the engine at the moment of the engine change) and converging to the targets, the engine device cmyk set is obtained. The 4×4 LUT is formed between the uniform gridded CMYK set and the engine device cmyk set.

In one example embodiment, the present method for generating a fleet CMYK to engine cmyk LUT in a color management system involves performing the following. First, a CMYK node file is created and a fleet printer model is received. The fleet printer model can be obtained, for instance, from a fleet profile through the A2B tag. Each CMYK from a set of uniformly gridded CMYK values is passed through the fleet printer model to obtain corresponding L*a*b* values and at least a subset of the corresponding L*a*b* values are selected as L*a*b* target values. Selecting the L*a*b* target values can be effectuated using, for instance a principle component analysis method or a non-PCA technique such as wavelets, Fourier, and DCT. Then, for each CMYK node, an auxiliary input T is defined which comprises user defined parameters specified for each CMYK node in the uniform grid. The set T is augmented with the L*a*b* target values to generate an augmented set L*a*b*T of target values. Once the augmented set of target values has been obtained, an iteration is performed on either the print engine of the device under test or a model of the printer such that device cmyk values can be obtained. At each iteration thereof, a set of constrained output T is formed. The iterating terminates at either a convergence of a measured L*a*b* and the constrained output set T to the augmented set L*a*b*T within a pre-determined error limit, or a maximum number of iterations having occurred. Thereafter, a 4-to-4 CMYK to cmyk LUT is generated using the CMYK and device cmyk values at the end of the iteration. The generated 4-to-4 CMYK to cmyk LUT is used to maintain color consistency in a fleet document reproduction device.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
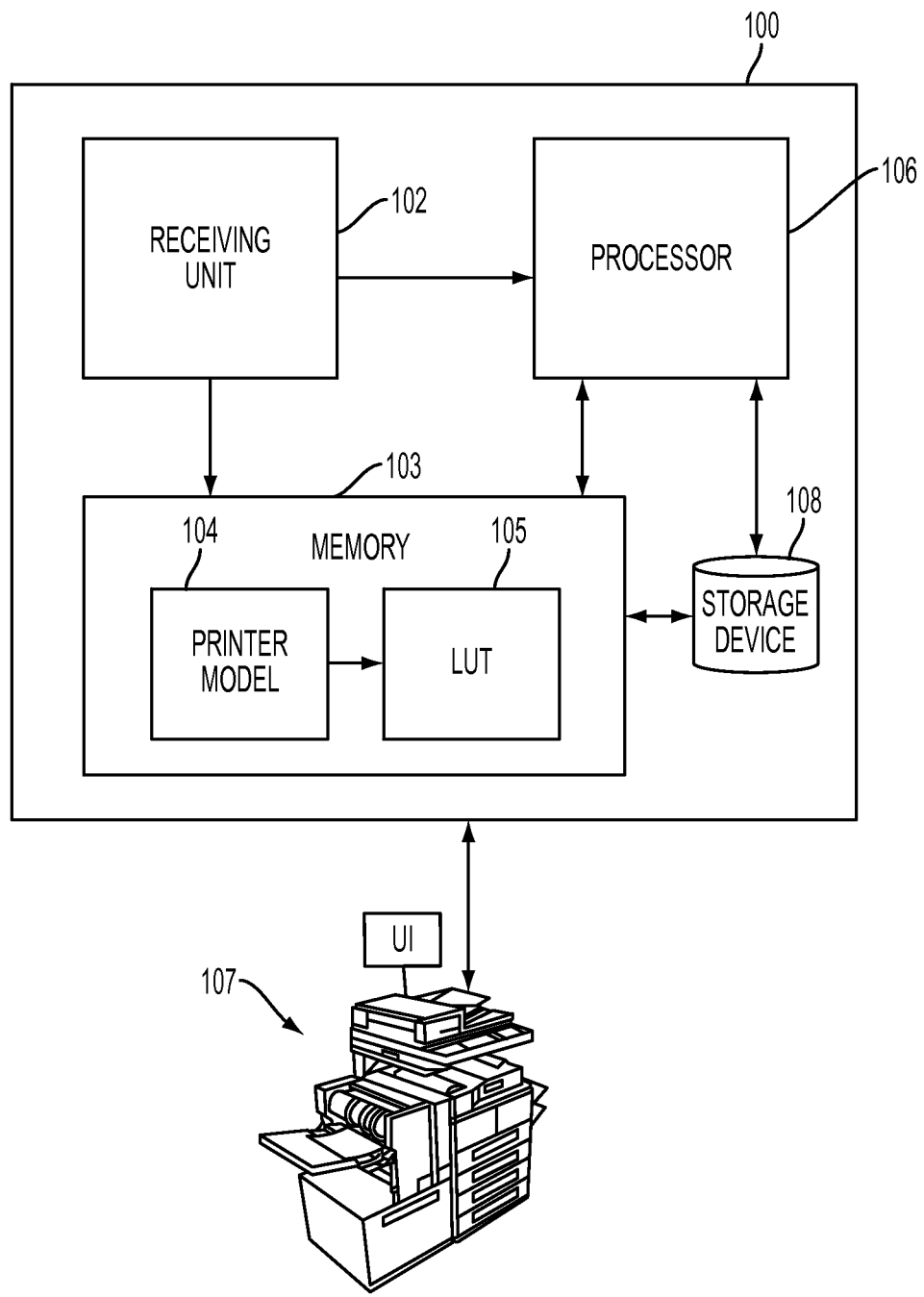
FIG. 1 is a block diagram of an example system for generating a LUT.

What is disclosed is a novel system and method which addresses the problem of inheriting color management intent from a fleet color management LUT into a 4-to-4 cascaded LUT to compensate for a change having occurred in an individual engine due to the engine having drifted or otherwise having changed. In a manner more fully discussed herein, input constraints are used to create the 4-to-4 profile LUTs using control iterations on every node color. A controller disclosed which is constructed by defining additional input to the feedback system with constraints. Outputs for the feedback loop are derived using similar constraints. CMYK preservation is obtained by the specific design of the set of constraints.

It should be understood that one of ordinary skill in this art would be readily familiar with many facets of color science and image processing, optimization theory, and other techniques and algorithms known to the color science arts. Those of ordinary skill would be familiar with the text: *"Digital Color Imaging Handbook"*, 1st Ed., CRC Press (2003), ISBN-13: 97808-4930-9007, and *"Control of Color Imaging Systems: Analysis and Design"*, CRC Press (2009), ISBN-13: 97808-4933-7468, both of which are incorporated herein in their entirety by reference.

NON-LIMITING DEFINITIONS

A "color space" refers to any standard color space that is commonly used to define or describe color.

"Color transformation" refers to the process of translating an input color space to an output color space. In conventional color management systems, a color transformation converts each input color space, on a color by color basis, into an output color space using mathematical algorithms represented by multiple color profiles. A first color profile converts an input color space to a standardized color space. A second color profile converts the standardized color space to an output color space.

A "Look-up Table" (LUT) is a multi-dimensional table used to map colorant combinations to the color space of a target device. A LUT comprises a plurality of sub-hypercubes (or sub-cubes) arrayed on a structured grid in a four dimensional colorant space of a color marking device. Each vertex of each sub-cube of the structured grid is associated with a colorant formulation and a corresponding output color. A high resolution LUT is a multi-dimension LUT comprising at least a size 70-cube. A low resolution LUT is a multi-dimensional LUT, e.g. ≤33-cube, built by selecting a subset of nodes from the high resolution LUT.

A "structured grid" is a partitioning of color space into a plurality of LUT sub-cubes arrayed on a plurality of LUT levels. A coarse grid is a partitioning of color space into a plurality of coarse LUT sub-cubes arrayed on a plurality of coarse LUT levels. The vertices of each sub-cube are referred to as coarse LUT nodes. The granularity of the coarse grid is a matter of choice based upon the color space, the complexity of the transformations employed and storage and memory constraints for representing the LUT. The structured coarse grid encompasses the entire gamut within its boundaries. A structured coarse grid does not have to be quantized into uniformly spaced and regularly shaped coarse LUT sub-cubes. A fine grid is a partitioning of color space into a plurality of fine LUT nodes arrayed on a plurality of fine LUT levels. The granularity of the fine grid is much finer than the granularity of the coarse grid, i.e., comprises a higher degree of quantization. A set of fine LUT nodes for a given coarse LUT sub-cube is created by dividing the space between neighboring coarse LUT nodes into a defined number of partitions. The fine LUT nodes within a given coarse LUT sub-cube do not have to be uniformly spaced.

A "profile LUT" generally comprising a series of nodes in an input color space. Stored at each node are device-specific output values such as CMYK.

A "destination profile LUT" translates a standardized color space to the color space of a target marking device.

A "CMYK node file" is a file containing values of colors located at the nodes of a CMYK color space.

A "printer model" relates inputs in device-dependent color space to outputs in device-independent color space. One example printer model has the form of a 4-D LUT for a CMYK printer.

A "fleet profile" is a profile for a family ("fleet") of print system architectures. The set of print systems includes monochrome or color digital document reproduction architectures, document scanning systems, a wide variety of printers/copiers, book/magazine/newspaper, digital printing presses, and other multi-function document reproduction systems. Such systems generally include a display device such as a CRT or touch screen along with one or more user interfaces such as a keyboard, mouse, keypad, touchpad, and the like, for entering data and configuring device-specific settings to optimize image quality and performance. Such complex devices further incorporate an image processing or color management system for processing image data.

A "Digital Front End" or DFE, is an application that typically takes the form of a special purpose computer (such as an ASIC), as are widely known in the digital document reproduction arts.

A "Print Engine" means any device that applies colorants to or generates colorants on a surface to produce an image.

"Engine Drift" means any measurable change in any aspect of print engine or print device behavior over time which adversely impacts the quality of an output print. Measureable changes may be due to a variety of factors including, component replacement, incorrect configuration, user error, device servicing, damaged or worn components, media, and the like.

Generic Profile Generation

Reference is now being made to FIG. 1 which illustrates a block diagram showing an example system for generating a LUT. In this embodiment, system 100 includes a receiving unit 102 that receives color signals intended to be printed. Processor 106 is configured to execute machine readable program instructions stored in memory 103. The generated lookup table (LUT) comprises the optimized printer profile LUT for a given print engine 107. Profile LUT 105 is generated using printer model 104. Color signals are stored in memory 103. Storage device 108 stores printer model 104. One method of generating a profile LUT generally involves the following steps:

1. Extract $L^*a^*b^*$ values from the RGB→$L^*a^*b^*$ grid for the in-gamut nodes that require control parameters (e.g., gain matrix);
2. Get the desired GCR profile file;
3. Extract CMYK values from the desired GCR profile for nodes from step 1;
4. Obtain the most recent printer model (e.g., CMYK→$L^*a^*b^*$ LUT or model) for the printer (or class of printers) in which the GCR has to be reproduced;
5. Find the Jacobian and gain matrix for the printer model of step four at the nodes shown in step one using initial CMYK from step 3;
6. Run the control algorithm for several iterations on the printer model or printer for the nodes of step one using the gain matrix from step five and the initial CMYK from step 3. Typically 10 to 50 iterations are used to while iterating on the printer model sufficient to reach convergence on the printer model and two to four iterations are used while iterating on the printer when measurements are made on a media printed on a sheet fed press.
7. Filter CMYK values using smoothing algorithms;
8. Repeat steps 5 to 7 using initial CMYK (obtained in step 7); and
9. Save the initial CMYK values for runtime profile creation.

One of ordinary skill in this art would understand how to create a 4-to-4 LUT. Such methods are well known to those of ordinary skill in the color science arts. See chapter 7 of the above-reference text: "*Control of Color Imaging Systems: Analysis and Design*". While the system of FIG. 1 is shown as being external to the printer 107, it should be appreciated that system 100 can be incorporated, in whole or in part, as a system or sub-system within the print system device.

Schematic of Cascade Strategy

Figure 2:
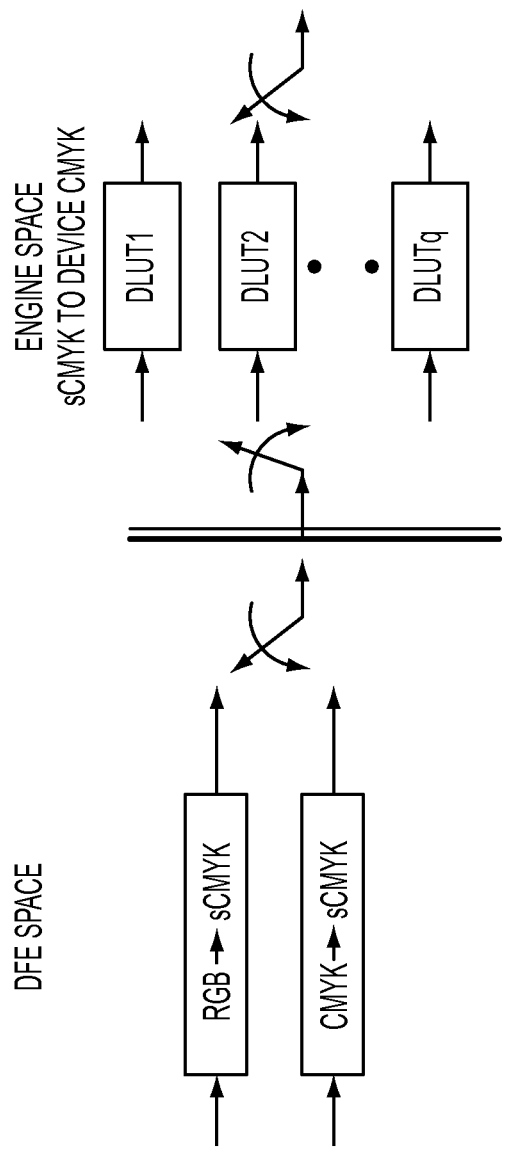
FIG. 2 shows a generalized schematic of an example cascade strategy.

A generalized schematic of an example cascade strategy is shown in FIG. 2. In a cascaded color management strategy, many elements of color management such as mapping and GCR are handled inside the fleet profile that resides in the DFE, while the variation of the individual engine is handled by a multi-dimensional LUT. The LUT that transforms the fleet CMYK to the engine cmyk for printing resides in the engine. When the engine changes due to drifting or component replacement, the LUT has to be updated. One requirement for the 4×4 LUT is that it must preserve the color management strategies such as the GCR of the fleet profile as much as possible. The updated 4×4 must also meet this requirement. In the DFE space of FIG. 2, DFE/Image processing is performed on a cloud/grid/web with 3-to-4D/ND or 4-to-4D/ND LUTs. The engine space of FIG. 2 shows an example print engine with custom 4D/ND LUTs shown for 'q' number of media. Some of the advantages of the cascade strategy are: (1) it can have one DFE with the fleet profile to drive a set of engines so that cost will be lower; and (2) it has a clean separation between the DFE and the engine so that development of the DFE and the engine color management system can be separated.

Example Controller Architecture

Figure 3:
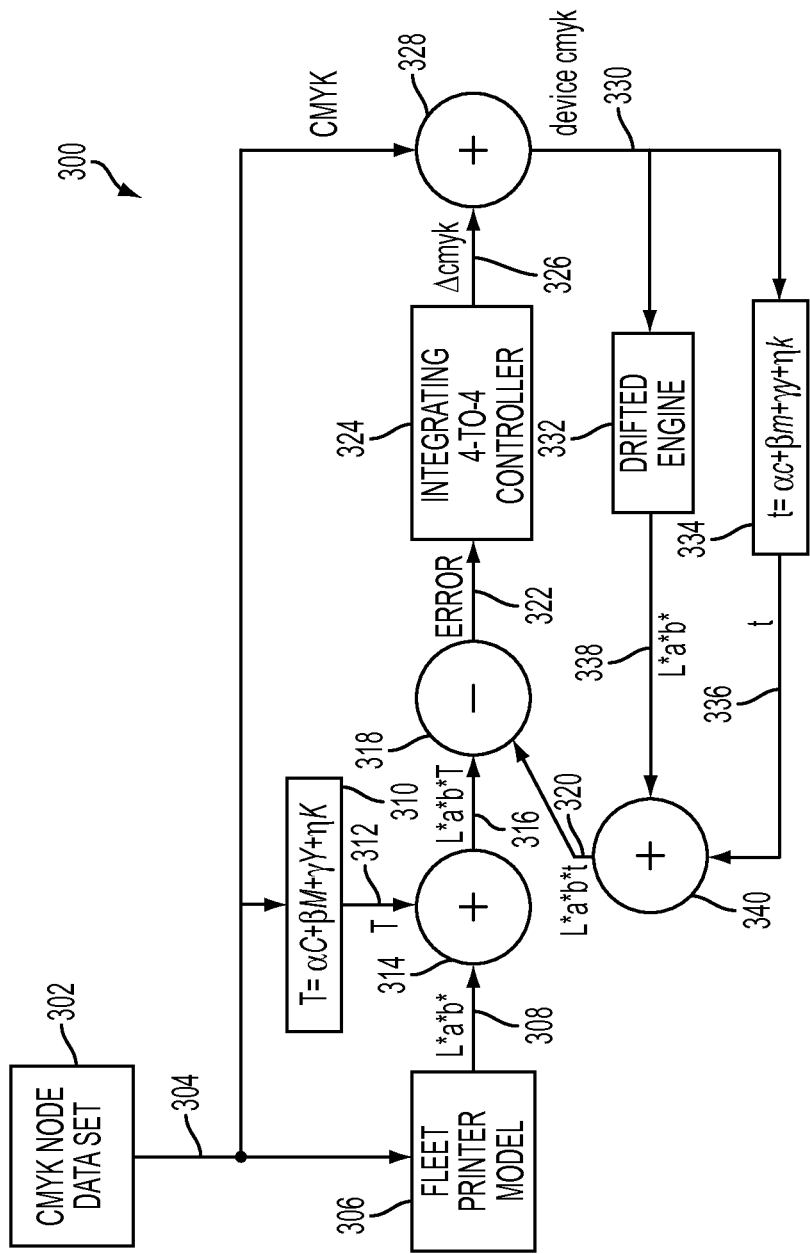
FIG. 3 is a block diagram of a controller with input constraints for a four color CMYK printer.

Reference is now made to the N-to-N Feedback Controller 300 of FIG. 3. A set of uniformly gridded CMYK input nodes 302 are received. A first input CMYK node 304 is passed through fleet printer model 306 to obtain a respective set of corresponding $L^*a^*b^*$ values 308. Input CMYK node 304 is also provided to auxiliary target generator 310 and is used to initiate the iterative cmyk correction process because we want the device cmyk 330 to be as close to the input CMYK value 304 as possible. Auxiliary Target Generator 310 generates an auxiliary input $T=\alpha C+\beta M+\gamma Y+\eta K$, where $\alpha$, $\beta$, $\gamma$, and $\eta$ are parameters which have been specified for input CMYK node 304 in CMYK node data list 302. Different parameters can be used to generate the auxiliary input T for each input CMYK node. Auxiliary input T 312 and $L^*a^*b^*$ target 308 are combined (at 314) into a set of target 4 component vectors ($L^*a^*b^*T$) 316. Difference generator 318 produces error 322 which is used to determine whether $L^*a^*b^*t$ 320 has converged to $L^*a^*b^*T$ 316 to within an acceptable limit. Integrating 4-to-4 Controller 334 receives error 322 and increments $\Delta$cmyk 326 accordingly so as to decrease the error. Adder 328 adds the $\Delta$cmyk 326 to initial CMYK 304 to obtain, on each iteration, a device cmyk 330. Feedback controller 300 uses the device cmyk 330 to drive a difference (322) between target $L^*a^*b^*T$ (316) and $L^*a^*b^*t$ (320) to zero. Values of device cmyk 330 are passed through drifted engine 332 (or a model of the engine) and to the Second Auxiliary Target Generator 334 to begin a second iteration. On a first iteration, $\Delta$cmyk 326 will be zero, device cmyk 330 will be the input CMYK 304, and $L^*a^*b^*$ 330 will be a corresponding output of the drifted engine (or an output of a model of the drifted engine). Drifted engine 332 produces $L^*a^*b^*$ 338 as output values. These values can be obtained from measurements of test patches printed by the drifted device. The device cmyk 330 are also provided to Constraint Generator 334 which calculates a set of constrained cmyk targets $t=\alpha c+\beta m+\gamma y+\eta k$ (336) based on the device cmyk. $L^*a^*b^*$ 338 and cmyk target constraint t 336 are combined (at 340) into a 4 component vector given by: $L^*a^*b^*t$ 320 which, in turn, is provided to difference generator 318. On each iteration, another error 322 is calculated. Each iteration generates a new device cmyk 330 which, in turn, is used to create a new constraint t 336 and an associated output $L^*a^*b^*$ 338. The generated constraint 336 and the output $L^*a^*b^*$ 338 are again combined to obtain a new $L^*a^*b^*t$. The iteration ends when error 322 is within a pre-set error limit, or a maximum number of iterations has occurred. When the iteration process is complete, a 4×4 LUT is formed using CMYK 304 and device cmyk 330 from the last iteration (having the minimum error). The 4×4 LUT is provided to the drifted printer wherein it is used to generate color values which compensate for engine drift or the engine having changed as a result of component replacement. It should be appreciated that, by selecting $\alpha \propto 255-C$, $\beta \propto 255-M$, $\gamma \propto 255-Y$ and $\eta \propto 255-K$ in constraint generation module 322, all single separation colors in the input CMYK will remain in single separation in the device cmyk as the controller, through a process of iteration, forces a zero digital count in the CMYK space to be zero in the device cmyk space. Extensions to N colors can be effectuated using various combinations of colorants as targets. Additional colorant feedback loops will be necessary to handle the additional degrees of freedom.

Example Flow Diagram

Figure 4:
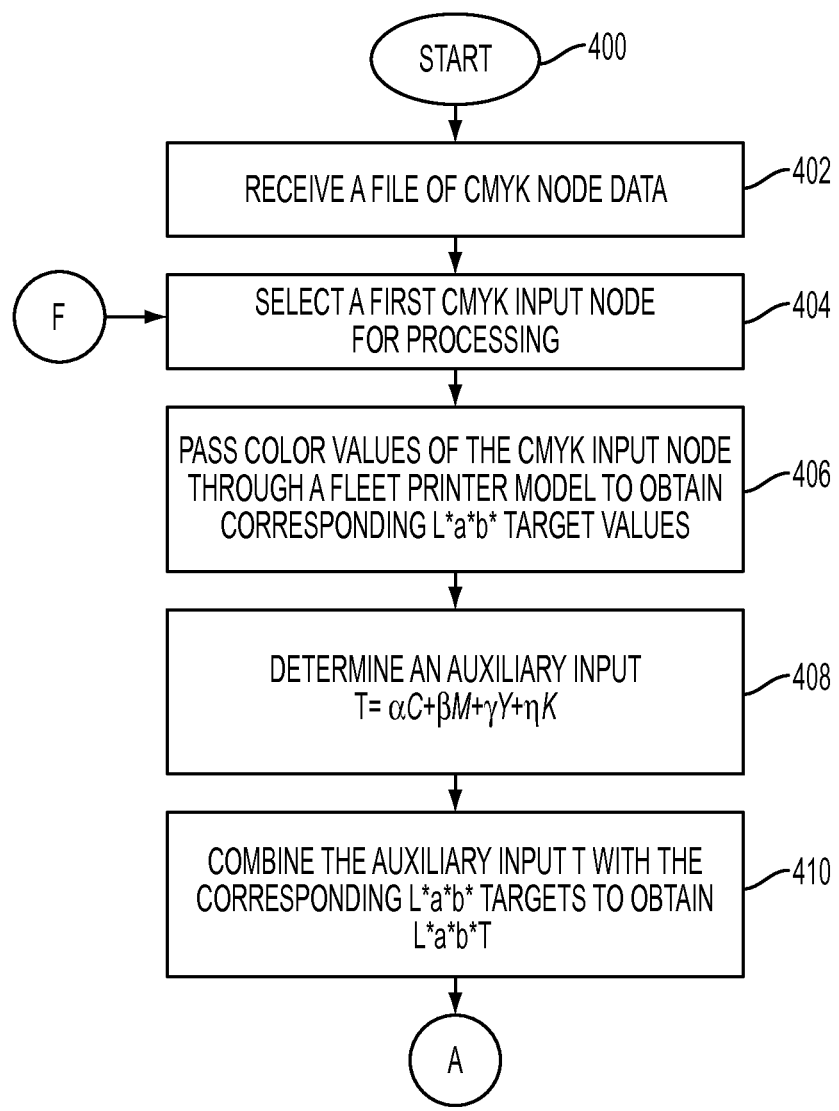
FIG. 4 is a flow diagram of one example embodiment of the present method for generating a fleet CMYK to engine cmyk LUT in a color management system.

Reference is now being made to the flow diagram of FIG. 4 which illustrates one example embodiment of the present method for compensating for an amount of change in a print engine to maintain color consistency in a document reproduction system. Flow processing begins at step 400 and immediately proceeds to step 402.

At step 402, a file of CMYK node data (302 of FIG. 3) containing colors in a CMYK space is received or otherwise retrieved. The CMYK data file can be retrieved from a storage device or received from a remote device over a network. The values may be entered by a user via a graphical user interface of a computer workstation.

At step 404, a first CMYK input node is selected from the set of uniformly gridded CMYK values in the CMYK node data file for processing.

At step 406, color values of the CMYK input node (step 402) are passed through the fleet printer model to obtain corresponding L*a*b* values (308). In another embodiment, all of the CMYK node data is passed through the fleet printer model and all or a subset of the generated corresponding L*a*b* values are selected for processing. A selection of L*a*b* values can be effectuated using, for example, Principle Component Analysis (PCA) because the relation between the fleet CMYK and the device cmyk is likely nearly linear if the fleet printer is not far from the engine. PCA construction can be performed at the factory by simulating drift conditions on an engine of a fleet device. This in-factory step results in PCA vectors and a number and location of critical patches for iterating in the field. A weighted combination of the PCA vectors can be formed and the weights updated in the field using measurements obtained from the printed patches. The weighted PCA vectors can be used to determine the complete set of device cmyk values for all input CMYK nodes. Weights are updated using techniques described in the above-incorporated reference: "Image Output Color Management System And Method". A non-PCA technique can be used to select the subset of L*a*b* values. Non-PCA techniques include, for instance, wavelets, Fourier, and DCT methods.

At step 408, an auxiliary input T is determined. Auxiliary input T comprises a set of user-defined parameters specified for the selected CMYK input node. A user may enter values for these parameters using a user interface of a workstation. These values may be retrieved from a storage device or received from a remote device over a network.

At step 410, auxiliary input T is combined with the corresponding L*a*b* values (step 406) to produce a set of target 4 vectors given by: L*a*b*T.

Figure 5:
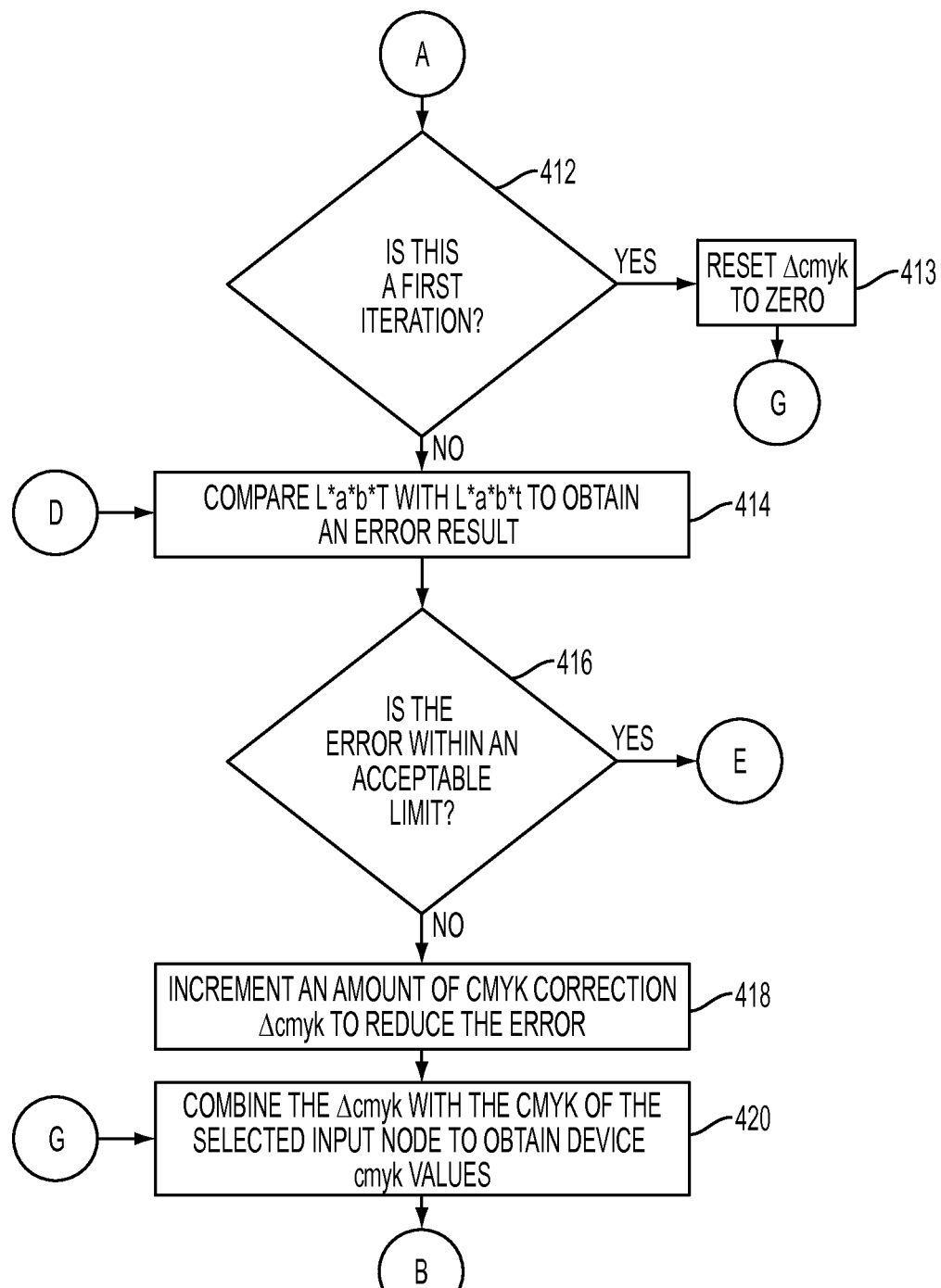
FIG. 5 is a continuation of the flow diagram of FIG. 4 with flow processing continuing with respect to node A.

Reference is now being made to FIG. 5 which is a continuation of the flow diagram of FIG. 4 with flow processing continuing with respect to node A.

At step 412, a determination is made whether this is a first iteration. In this embodiment, since the constrained set of target vectors L*a*b*t have not been generated yet, the comparison (step 414) is skipped on a first iteration. Processing proceeds to step 413 wherein the amount of CMYK correction (Δcmyk) is set to zero and processing then proceeds to node G (step 420).

At step 414, the L*a*b*T is compared to the constrained target vectors L*a*b*t (step 426) to obtain error result (322).

At step 416, a determination is made whether the error (step 414) is within a pre-set limit of acceptability (or a maximum number of iterations have occurred). If so then processing continues with respect to node E wherein, at step 428, the device cmyk (step 420) remaining at the last iteration corresponding to the selected CMYK input node (step 404) and the associated L*a*b* output values (step 422) are stored to a memory or a storage device for subsequent retrieval and generation of the 4×4 CMYK to cmyk LUT (432). Further iterations end for the selected CMYK input node. Thereafter, processing continues with respect to step 430 wherein a determination is made whether any more CMYK input nodes remain to be selected for processing. If so then processing repeats with respect to node F wherein, at step 404, a next CMYK input node is selected. All variables are re-initialized to default values, and the next selected CMYK input is iteratively processed until the error value generated in the feedback loop is within a pre-set limit (or a maximum number of iterations has occurred). All desired CMYK input nodes are similarly processed.

At step 418, an amount of CMYK correction (Δcmyk) is incremented to reduce the error (step 412). On a first iteration, the Δcmyk (326) is initialized to zero for each selected CMYK input node. As shown in FIG. 3, the Δcmyk (326) is generated by Integrating 4-to-4 Controller (324) which, on each iteration, increments the amount of CMYK correction which is to be applied to the color values of the CMYK input node (304) to reduce the error (322) between the desired target L*a*b*T (316) and the constrained set of target vectors L*a*b*t (320).

At step 420, the color values of the selected CMYK input node (step 404) and the Δcmyk (of step 418) are combined to obtain device cmyk values (330). This combination is produced by Adder 328 of FIG. 3. New device cmyk values are produced in each iteration of the feedback controller.

Figure 6:
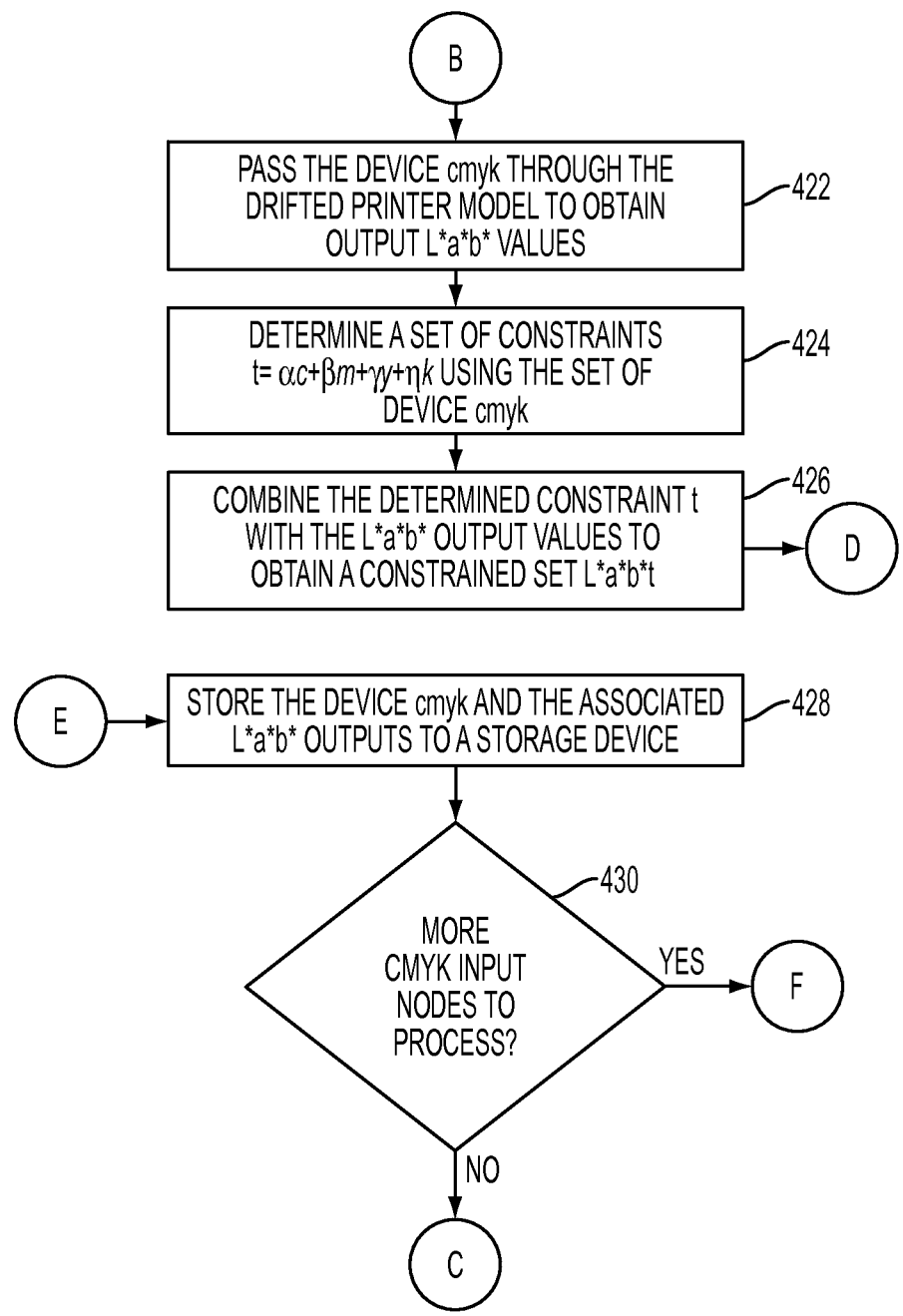
FIG. 6 is a continuation of the flow diagram of FIG. 5 with flow processing continuing with respect to node B.

Reference is now being made to FIG. 6 which is a continuation of the flow diagram of FIG. 5 with flow processing continuing with respect to node B.

At step 422, the device cmyk (step 420) are passed through the drifted printer model (or the printer) to obtain output L*a*b* values (338). A new set of L*a*b* output values is obtained on each iteration. The device cmyk can be provided to the printer to obtain color patches and the output L*a*b* values obtained from the printed patches using a color measurement device such as, for example, a spectrophotometer or a colorimeter.

At step 424, the device cmyk (step 420) are used to create a constrained set of target cmyk values given by: t=αc+βm+γy+ηk. A new set of constrained cmyk targets is produced each iteration.

At step 426, the output L*a*b* values (step 422) are combined with the constrained cmyk (step 424) to obtain a set of target vectors L*a*b*t. Thereafter, processing continues with respect to node D wherein, at step 414, the target L*a*b*T is compared to the constrained target L*a*b*t obtained in the current iteration. At step 416, a determination is made whether these two vectors have converged to within a pre-defined limit (or a maximum number of iterations has occurred). If either has not occurred then processing continues again with respect to step 418. The process repeats until either a convergence has occurred or a maximum number of iterations has been reached. If, at step 416, the error is within an acceptable limit (or a maximum number of iterations has occurred) then processing continues with respect to node E wherein, at step 428, the device cmyk remaining at the last iteration corresponding to the selected CMYK input node are stored to a memory or a storage device. The associated L*a*b* outputs are also stored.

At step 430, a determination is made whether any more CMYK input nodes remain to be selected for processing. If so, then processing repeats with respect to node F wherein, at step 404, a next CMYK input node is selected for processing. Processing repeats in such a manner until all selected CMYK nodes have been processed. Processing can proceed automatically using the techniques hereof such that device cmyk values and respective output L*a*b* values are generated and stored for all CMYK input nodes. If there are no more CMYK input nodes to process the processing continues with respect to node C.

Figure 7:
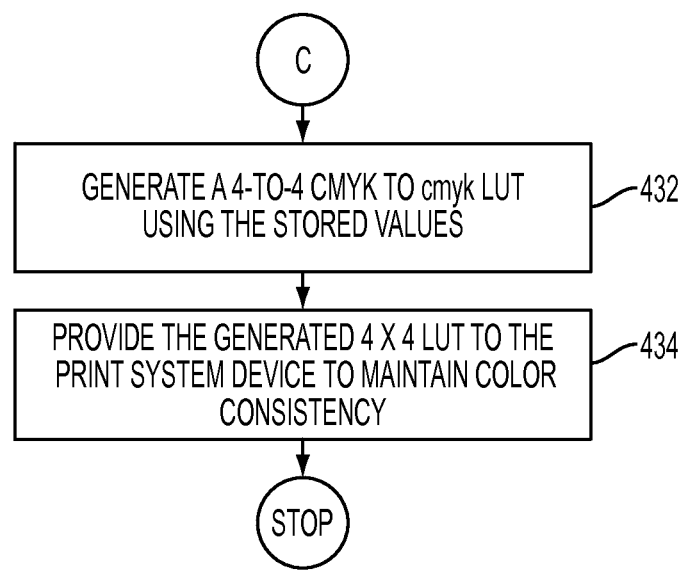
FIG. 7 is a continuation of the flow diagram of FIG. 6 with flow processing continuing with respect to node C.

Reference is now being made to FIG. 7 which is a continuation of the flow diagram of FIG. 6 with flow processing continuing with respect to node C.

At step 430, a 4-to-4 CMYK to cmyk LUT is generated using the device cmyk and corresponding CMYK inputs which have been previously stored.

At step 432, the generated 4×4 LUT is provided to the drifted device to maintain color consistency. Thereafter, processing ends. The generated 4×4 LUT can be saved to a storage device such as a hard disk or a memory or communicated to a remote device over a network.

It should be understood that the flow diagrams depicted herein are illustrative. One or more of the operations illustrated in any of the flow diagrams may be performed in a differing order. Other operations may be added, modified, enhanced, condensed, integrated, or consolidated. Variations thereof are intended to fall within the scope of the appended claims. All or portions of the flow diagrams may be implemented partially or fully in hardware in conjunction with machine executable instructions in communication with various components of such a system.

Example Networked System

Figure 8:
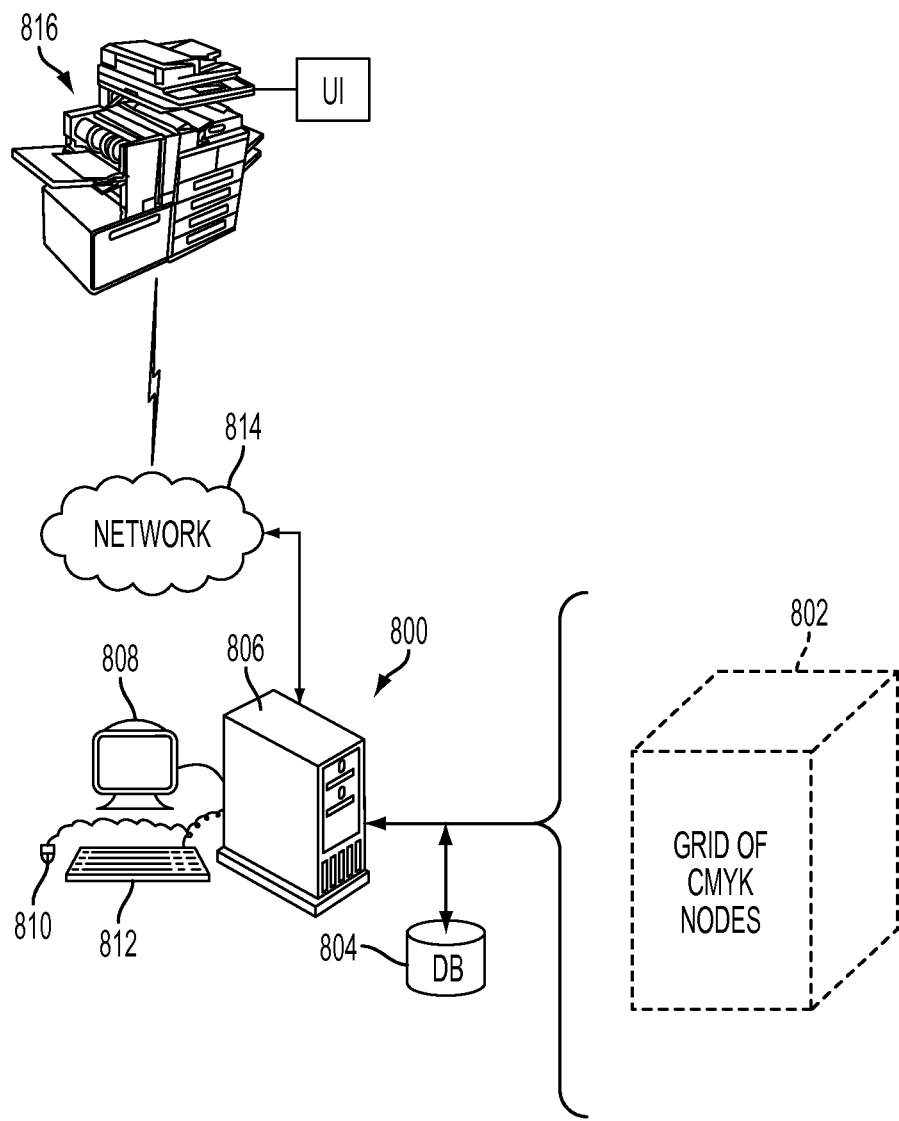
FIG. 8 illustrates an example networked system wherein various aspects of the present system and method are performed and the generated 4-to-4 CMYK to cmyk LUT is communicated to digital document reproduction device over a network.

Reference is now being made to FIG. 8 which illustrates an example networked system wherein various aspects of the present system and method are performed and the 4-to-4 CMYK to cmyk LUT is communicated to digital document reproduction system 107 of FIG. 1 over a network.

The networked computer workstation 800 retrieves the CMYK node data file (shown as a structured grid 802) from storage device 804. Computer system 800 is configured to perform any of the various aspects of the present method described with respect to the flow diagrams hereof. Computer system 800 includes a hard drive (internal to computer housing 806) which reads/writes to a machine readable media such as a floppy disk, optical disk, CD-ROM, DVC, magnetic tape, etc. Computer case 806 generally houses a motherboard with a processor and memory, a communications link such as a network card, video graphics card, and other software and hardware to perform the functionality of a computer system. The computer system further includes a graphical user interface which, in various embodiments, comprises display device 808 such as a CRT, LCD, touchscreen, and the like, mouse 810 and keyboard 812. Workstation 800 has an operating system and other specialized software configured to display a wide variety of numeric values, text, scroll bars, dials, slideable bars, pull-down menus, selectable options, buttons, and the like, for entering, selecting, modifying, accepting any of the displayed information such as an input CMYK node to process. The embodiment shown is only illustrative and may include any other functionality which any display device known in the arts is capable of displaying. The display device merely illustrates one example embodiment. Software to configure a user interface or any portion thereof to display/enter/accept data is highly customizable and may be device dependent. Such software is usually considered proprietary. Therefore, a further discussion regarding specific programming techniques and software algorithms to program or otherwise configure a display device to display a certain set of settings is omitted herein. One of ordinary skill would program their display portions for a specific system in a particular print/copy job environment. The computer system is capable of communicating with any number of computer systems and document reproduction system(s) similarly connected to network 814. Any default settings and initialization parameters can be retrieved from storage device 804. Although shown as a desktop computer, it should be appreciated that the computer workstation 800 can be any of a laptop, mainframe, client/server, or a special purpose computer such as an ASIC, circuit board, dedicated processor, or the like.

Workstation 800 is configured to receive a fleet printer model and perform any of the functionality of the feedback controller of FIG. 3 and generate and store a 4×4 LUT in accordance with the teachings hereof. It should be appreciated that some or all of the functionality described for any of these modules of the Feedback Controller of FIG. 3 may be performed, in whole or in part, within computer workstation 800 or by a special purpose computer system. The generated 4×4 LUT can be provided to document reproduction system 816 via network 814 such as the Internet. Many aspects of the network, illustrated as an amorphous cloud, are known. As such, a detailed discussion as to the operation of the network or the configuration thereof has been omitted. Suffice it to say, data packets are transmitted by a network of special purpose servers connected via a plurality of communication links. Data is transferred in the form of signals which may be, for example, electrical, electronic, electro-magnetic, optical, or other signals. These signals are transmitted by wire, cable, fiber optic, phone line, cellular link, RF, satellite, or any other medium or communications link known in the arts. One computing device with access to the network communicates with another device with access to the network using well established network communication protocols.

Various modules described herein with respect to the Feedback Controller of FIG. 3 may designate one or more components which may, in turn, each comprise software and/or hardware designed to perform a specific function. A plurality of modules may collectively perform a single function. A module may have a specialized processor capable of reading machine executable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules includes both physical and logical connections. Modules may include software/hardware modules which may comprise an operating system, drivers, controllers, and other apparatuses, some or all of which may be connected via a network.

It is also contemplated that one or more aspects of the present method may be practiced in distributed computing environments where tasks are performed by remote processing devices that are linked through a communication network. In a distributed computing environment, program modules for performing various aspects of the present system and method. Other embodiments include a special purpose computer designed to perform the methods disclosed herein. The methods described can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Changes to the above-described embodiments may be made without departing from the spirit and scope of the invention. The teachings of any printed publications including patents and patent applications, are each separately hereby incorporated by reference in their entity.

What is claimed is:

1. A method for generating a fleet CMYK to engine cmyk LUT in a color management system, the method comprising:
   creating a CMYK node file of colors in a CMYK space;
   receiving a printer model of a fleet of document reproduction devices;
   passing each CMYK value from the said CMYK node file through said fleet printer model to obtain corresponding L*a*b* values;
   selecting at least a subset of said corresponding L*a*b* values as L*a*b* target values;
   for each given CMYK node, defining an auxiliary input T comprising user defined parameters specified for each input node in said CMYK node file;
   adding set T to said set of L*a*b* target values to generate a set L*a*b*T of target 4 vectors;
   iterating on any of: a printer and a printer model, wherein at each iteration, a set of constrained output t is formed, said iterating terminating at any of: a convergence of a measured L*a*b* and said constrained output set t to said target set L*a*b*T within a pre-determined error limit, and a maximum number of iterations having occurred; and
   generating a 4-to-4 CMYK to cmyk LUT using CMYK and device cmyk values at an end of said iteration.

2. The method of claim 1, wherein said set T, for each given CMYK node, is defined by: $T=\alpha C+\beta M+\gamma Y+\eta K$, where $\alpha$, $\beta$, $\gamma$, and $\eta$ are user defined parameters specified for each input node and wherein said constrained output t, formed on each iteration, is defined by: $t=\alpha c+\beta m+\gamma y+\eta k$.

3. The method in claim 2, wherein said user defined parameters comprise: $\alpha \propto 255-C$, $\beta \propto 255-M$, $\gamma \propto 255-Y$ and $\eta \propto 255-K$, so that at least some single separation colors in said CMYK space remain as single separation colors in a device cmyk space.

4. The method of claim 1, wherein said fleet printer model is obtained from a fleet profile through an A2B tag.

5. The method of claim 1, wherein selecting said subset of corresponding L*a*b* values as L*a*b* target values comprises any of: a principle component analysis (PCA), and a non-PCA technique comprising any of: wavelets, Fourier, and DCT.

6. The method of claim 5, wherein said PCA construction is performed at a factory by simulating drift conditions on a print engine, said simulations resulting in a set of PCA vectors and a number and a location of critical patches for iterating in the field.

7. The method of claim 6, further comprising forming a weighted combination of said PCA vectors, said weights being updated in the field using measurements obtained from said critical patches, and using said weighted combination of said PCA vectors to determine the complete set of output cmyk values for all the input CMYK nodes.

8. The method of claim 1, further comprising using said generated 4-to-4 CMYK to cmyk LUT to maintain color consistency in a fleet document reproduction device.

9. The method of claim 1, further comprising saving said generated 4-to-4 CMYK to cmyk LUT to a storage device.

10. A system for generating a fleet CMYK to engine cmyk LUT, the system comprising:
    a memory and a storage medium; and
    a processor in communication with said storage medium and said memory, said processor executing machine readable instructions for performing the method of:
    creating a CMYK node file of colors in a CMYK space;
    receiving a printer model of a fleet of document reproduction devices;
    passing each CMYK value from the said CMYK node file through said fleet printer model to obtain corresponding L*a*b* values;
    selecting at least a subset of said corresponding L*a*b* values as L*a*b* target values;
    for each given CMYK node, defining an auxiliary input T comprising user defined parameters specified for each input node in said CMYK node file;
    adding set T to said set of L*a*b* target values to generate a set L*a*b*T of target 4 vectors;
    iterating on any of: a printer and a printer model, wherein at each iteration, a set of constrained output t is formed, said iterating terminating at any of: a convergence of a measured L*a*b* and said constrained output set t to said augmented set L*a*b*T within a pre-determined error limit, and a maximum number of iterations having occurred; and generating a 4-to-4 CMYK to cmyk LUT using CMYK and device cmyk values at an end of said iteration.

11. The system of claim 10, wherein said set T, for each given CMYK node, is defined by: $T=\alpha C+\beta M+\gamma Y+\eta K$, where $\alpha$, $\beta$, $\gamma$, and $\eta$ are user defined parameters specified for each input node and wherein said constrained output t, formed on each iteration, is defined by: $t=\alpha c+\beta m+\gamma y+\eta k$.

12. The system of claim 11, wherein said user defined parameters $\alpha$, $\beta$, $\gamma$, and $\eta$ comprise: $\alpha \propto 255-C$, $\beta \propto 255-M$, $\gamma \propto 255-Y$ and $\eta \propto 255-K$, so that at least some single separation colors in said CMYK space remain as single separation colors in the device cmyk space.

13. The system of claim 10, wherein said fleet printer model is obtained from a fleet profile through an A2B tag.

14. The system of claim 10, wherein selecting said subset of corresponding L*a*b* values as L*a*b* target values comprises any of: a principle component analysis (PCA), and a non-PCA technique comprising any of: wavelets, Fourier, and DCT.

15. The system of claim 14, wherein said PCA construction is performed at a factory by simulating drift conditions on a print engine, said simulations resulting in a set of PCA vectors and a number and a location of critical patches for iterating in the field.

16. The system of claim 15, further comprising forming a weighted combination of said PCA vectors, said weights being updated in the field using measurements obtained from said critical patches, and using said weighted combination of said PCA vectors to determine the complete set of output cmyk values for all the input CMYK nodes.

17. The system of claim 10, further comprising using said generated 4-to-4 CMYK to cmyk LUT to maintain color consistency in a fleet document reproduction device.

18. The system of claim 10, further comprising saving said generated 4-to-4 CMYK to cmyk LUT to a storage device.

19. A computer implemented method for generating a fleet CMYK to engine cmyk LUT in a color management system, the method comprising:
  creating a CMYK node file of colors in a CMYK space;
  receiving a printer model of a fleet of document reproduction devices;
  passing each CMYK value from the said CMYK node file through said fleet printer model to obtain corresponding L*a*b* values;
  selecting at least a subset of said corresponding L*a*b* values as L*a*b* target values;
  for each given CMYK node, defining an auxiliary input T comprising user defined parameters specified for each input node in said CMYK node file;
  adding set T to said set of L*a*b* target values to generate a set L*a*b*T of target 4 vectors;
  iterating on any of: a printer and a printer model, wherein at each iteration, a set of constrained output t is formed, said iterating terminating at any of: a convergence of a measured L*a*b* and said constrained output set t to said augmented set L*a*b*T within a pre-determined error limit, and a maximum number of iterations having occurred; and
  generating a 4-to-4 CMYK to cmyk LUT using CMYK and device cmyk values at an end of said iteration.

20. The computer implemented method of claim 19, wherein said set T, for each given CMYK node, is defined by: $T=\alpha C+\beta M+\gamma Y+\eta K$, where $\alpha$, $\beta$, $\gamma$, and $\eta$ are user defined parameters specified for each input node and wherein said constrained output t, formed on each iteration, is defined by: $t=\alpha c+\beta m+\gamma y+\eta k$, said user defined parameters $\alpha$, $\beta$, $\gamma$, and $\eta$ comprising: $\alpha \propto 255-C$, $\beta \propto 255-M$, $\gamma \propto 255-Y$ and $\eta \propto 255-K$, so that at least some single separation colors in said CMYK space remain as single separation colors in the device cmyk space.

21. The computer implemented method of claim 19, wherein selecting said subset of corresponding L*a*b* values as L*a*b* target values comprises any of: a principle component analysis (PCA), and a non-PCA technique comprising any of: wavelets, Fourier, and DCT.

22. The computer implemented method of claim 21, wherein said PCA construction is performed at a factory by simulating drift conditions on a print engine, said simulations resulting in a set of PCA vectors and a number and a location of critical patches for iterating in the field.

23. The computer implemented method of claim 22, further comprising forming a weighted combination of said PCA vectors, said weights being updated in the field using measurements obtained from said critical patches, and using said weighted combination of said PCA vectors to determine the complete set of output cmyk values for all the input CMYK nodes.

24. The computer implemented method of claim 19, further comprising using said generated 4-to-4 CMYK to cmyk LUT to maintain color consistency in a fleet document reproduction device.

25. The computer implemented method of claim 19, further comprising saving said generated 4-to-4 CMYK to cmyk LUT to a storage device.

* * * * *